(12) United States Patent
Lei

(10) Patent No.: US 12,224,900 B2
(45) Date of Patent: Feb. 11, 2025

(54) METHOD AND SYSTEM FOR CONFIGURING BMC IP ADDRESSES OF BARE METAL SERVERS, MEDIUM AND DEVICE

(71) Applicant: INSPUR SUZHOU INTELLIGENT TECHNOLOGY CO., LTD., Jiangsu (CN)

(72) Inventor: Yashuai Lei, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 100 days.

(21) Appl. No.: 18/037,852

(22) PCT Filed: Dec. 30, 2021

(86) PCT No.: PCT/CN2021/142849
§ 371 (c)(1),
(2) Date: May 19, 2023

(87) PCT Pub. No.: WO2022/148291
PCT Pub. Date: Jul. 14, 2022

(65) Prior Publication Data
US 2024/0007347 A1  Jan. 4, 2024

(30) Foreign Application Priority Data

Jan. 8, 2021 (CN) .......................... 202110023837.8

(51) Int. Cl.
*H04L 41/0806* (2022.01)
*H04L 41/08* (2022.01)
*H04L 61/5007* (2022.01)

(52) U.S. Cl.
CPC ...... *H04L 41/0806* (2013.01); *H04L 41/0886* (2013.01); *H04L 61/5007* (2022.05)

(58) Field of Classification Search
None
See application file for complete search history.

(56) References Cited

U.S. PATENT DOCUMENTS

2012/0124242 A1* 5/2012 Chen ...................... H04L 67/06
709/250
2020/0133686 A1* 4/2020 Lakshminarasimha ......................
G06F 9/4416
(Continued)

FOREIGN PATENT DOCUMENTS

| CN | 108900656 A | 11/2018 |
|----|-------------|---------|
| CN | 108989123 A | 12/2018 |

(Continued)

*Primary Examiner* — Mohamed Ibrahim
(74) *Attorney, Agent, or Firm* — IPro, PLLC

(57) ABSTRACT

A method for configuring a BMC IP address of a bare-metal server, comprising: deploying an Ironic service and a TFTP service on a management control platform, and registering bare-metal servers based on serial numbers of the bare-metal servers and corresponding BMC IP addresses; in response to a boot signal of the bare-metal server, fetching, by a PXE client, a PXE configuration file from the TFTP service to enable an IPA to be booted, reading an initialization configuration identifier in the PXE configuration file, and confirming whether to perform an initialization configuration for the booted bare-metal server; and in response to performing the initialization configuration for the booted bare-metal server, obtaining, by the IPA, the serial number of the booted bare-metal server from the Ironic service, and bare-metal-node information corresponding to the serial number, parsing out the BMC IP address from the bare-metal-node information, and configuring the BMC IP address.

19 Claims, 2 Drawing Sheets

(56) References Cited

U.S. PATENT DOCUMENTS

| | | | |
|---|---|---|---|
| 2020/0257519 A1 | 8/2020 | Shen et al. | |
| 2023/0205549 A1* | 6/2023 | Tsai | G06F 9/4416 |
| | | | 713/2 |

FOREIGN PATENT DOCUMENTS

| | | | |
|---|---|---|---|
| CN | 109144821 A | 1/2019 | |
| CN | 110677505 A | 1/2020 | |
| CN | 112073555 A | 12/2020 | |
| CN | 112866017 A | 5/2021 | |

* cited by examiner

METHOD AND SYSTEM FOR CONFIGURING BMC IP ADDRESSES OF BARE METAL SERVERS, MEDIUM AND DEVICE

CROSS-REFERENCE TO RELATED APPLICATION

The present application claims the priority of the Chinese patent application filed on Jan. 8, 2021 before the China National Intellectual Property Administration with the application number of CN202110023837.8 and the title of "METHOD AND SYSTEM FOR CONFIGURING BMC IP ADDRESSES OF BARE METAL SERVERS, MEDIUM AND DEVICE", the content which is incorporated herein in its entirety by reference.

FIELD

The present application relates to the technical field of bare-metal servers, and in particular, to a method for configuring a BMC IP address of a bare-metal server, and a system, a medium and a device thereof.

BACKGROUND

With the rapid development of cloud-computing technology and applications, in addition to a resource provision manner of elastic and scalable virtual machines, exclusive bare-metal services are increasingly favored by manufacturers and users. The bare-metal service provides an exclusive computing resource, which has the advantages of automatically distributing systems, automatically switching networks, and having no performance loss, and so on, and is widely used in scenarios of high-performance computing, key database, and so on. Public clouds and private clouds of respective major vendors have provided this service one after another, most of which adopt an Ironic project (a project for deployment and installation of bare-metal machines) in an OpenStack (an open-source project for cloud-computing infrastructure) to provide life cycle management for bare-metal servers.

Management for the bare-metal servers by an Ironic service is based on a BMC (Baseboard Management Controller) and an IPMI on the server. The BMC is a remote manager for a server, which may automatically monitor management events of a platform system, for example, a temperature overshoot, a voltage overshoot, a fan failure, a chassis intrusion, and so on, and record the events in a nonvolatile system-event log. The IPMI is an abbreviation of Intelligent Platform Management Interface, which is an industrial standard adopted to manage peripheral devices used in enterprise systems based on an Intel architecture, and this standard is laid down by Intel, Hewlett Packard, NEC (Nippon Electric Company, Ltd.), the United States Dell Computer, and SuperMicro (United States Super Micro Computer Co., Ltd.), and so on. Users may adopt the IPMI to monitor physical-health characteristics of the server, for example, a temperature, a voltage, a working status of a fan, a power status, and so on.

SUMMARY

The present application provides a method for configuring a BMC IP address of a bare-metal server, including following steps:

deploying an Ironic service and a TFTP service on a management control platform, and registering a plurality of bare-metal servers based on respective serial numbers of the plurality of bare-metal servers and corresponding BMC IP addresses of the plurality of bare-metal servers;

in response to a boot signal of the bare-metal server, fetching, by a PXE client, a PXE configuration file from the TFTP service to enable an IPA to be booted, reading, by the IPA, an initialization configuration identifier in the PXE configuration file, and confirming, by the IPA, whether to perform an initialization configuration for the booted bare-metal server based on the initialization configuration identifier; and in response to performing the initialization configuration for the booted bare-metal server, obtaining, by the IPA, the serial number of the booted bare-metal server from the Ironic service, and bare-metal-node information corresponding to the serial number of the booted bare-metal server, parsing out, by the IPA, the BMC IP address from the bare-metal-node information, and configuring, by the IPA, the BMC IP address to the booted bare-metal server.

In some embodiments, the registering the plurality of bare-metal servers based on the respective serial numbers of the plurality of bare-metal servers and the corresponding BMC IP addresses of the plurality of bare-metal servers, includes: registering the plurality of bare-metal servers through an Ironic extension interface.

In some embodiments, the registering the plurality of bare-metal servers based on the respective serial numbers of the plurality of bare-metal servers and the corresponding BMC IP addresses of the plurality of bare-metal servers, includes:

registering the plurality of bare-metal servers, based on the respective serial numbers of the plurality of bare-metal servers, the BMC IP addresses corresponding to the respective serial numbers of the plurality of bare-metal servers, and an IPMI netmask and an IPMI gateway address corresponding to the respective serial numbers of the plurality of bare-metal servers.

In some embodiments, the fetching, by the PXE client, the PXE configuration file from the TFTP service to enable the IPA to be booted, includes:

fetching, by the PXE client, the PXE configuration file from the TFTP service, to obtain a path of a kernel to be booted and a path of a memory file system to be booted;

booting, by the PXE client, the kernel corresponding to the booted bare-metal server through the path of the kernel, and the memory file system corresponding to the booted bare-metal server through the path of the memory file system; and booting the IPA in the memory file system.

In some embodiments, the confirming, by the IPA, whether to perform the initialization configuration for the booted bare-metal server based on the initialization configuration identifier, includes: confirming whether a value of the initialization configuration identifier is True.

In some embodiments, the obtaining, by the IPA, the serial number of the booted bare-metal server from the Ironic service, includes: obtaining hardware information of the booted bare-metal server through an Ironic interface, and obtaining the serial number of the booted bare-metal server from the hardware information.

In some embodiments, the parsing out, by the IPA, the BMC IP address from the bare-metal-node information, and configuring, by the IPA, the BMC IP address to the booted bare-metal server, includes: parsing out the BMC IP address, the IPMI netmask and the IPMI gateway address from the bare-metal-node information, and configuring the BMC IP address, the IPMI netmask and the IPMI gateway address to t the booted bare-metal server by invoking a command of ipmitool.

The present application further provides a system for configuring a BMC IP address of a bare-metal server, including: a bare-metal-server-registration module, configured to deploy an Ironic service and a TFTP service on a management control platform, and register a plurality of bare-metal servers based on respective serial numbers of the plurality of bare-metal servers and corresponding BMC IP addresses of the plurality of bare-metal servers; an initialization-configuration-identifier-reading module, configured to, in response to a boot signal of the bare-metal server, make a PXE client fetch a PXE configuration file from the TFTP service to enable an IPA to be booted, make the IPA read an initialization configuration identifier in the PXE configuration file, and make the IPA confirm whether to perform an initialization configuration for the booted bare-metal server based on the initialization configuration identifier; and a BMC-IP-address-configuration module, configured to, in response to performing the initialization configuration for the booted bare-metal server, make the IPA obtain the serial number of the booted bare-metal server from the Ironic service, and bare-metal-node information corresponding to the serial number of the booted bare-metal server, make the IPA parse out the BMC IP address from the bare-metal-node information, and make the IPA configure the BMC IP address to the booted bare-metal server.

The present application further provides a computer device, including: a storage and one or more processors, wherein the storage stores computer-readable instructions, and in response to that the computer-readable instructions are executed by the one or more processors, the computer-readable instructions cause the one or more processors to perform the steps of the method for configuring the BMC IP address of the bare-metal server in any of the foregoing embodiments.

The present application further provides one or more nonvolatile computer-readable storage media storing computer-readable instructions, wherein, in response to that the computer-readable instructions are executed by one or more processors, the computer-readable instructions cause the one or more processors to perform the steps of the method for configuring the BMC IP address of the bare-metal server in any of the foregoing embodiments.

BRIEF DESCRIPTION OF THE DRAWINGS

In order to more clearly illustrate the embodiments of the disclosure, the following will briefly introduce the drawings needed to be used in illustrating the embodiments. Apparently, the drawings in the following description are merely some embodiments of the present application, and for those ordinary skilled in the field, they may further obtain other embodiments according to the provided drawings without paying creative labor.

DETAILED DESCRIPTION OF THE EMBODIMENTS

In order to make technical solutions and advantages of the present application clearer, the following will further describe the embodiments of the present application in detail in combination with the concrete embodiments and with reference to the accompanying drawings.

It should be noted that, in the embodiments of the present application, terms "including" and "having" and any variation thereof are intended to cover non-exclusive including, for example, inherent other steps or units of a process, a method, a system, a product or a device including a series of steps or units.

In related art, it needs to log in to a BIOS (Basic Input Output System) configuration interface to manually configure an IP (Internet Protocol) address of the BMC. However, under a current circumstance where a cloud-computing cluster has a scale of hundreds or thousands of bare-metal servers, manually configuring the BMC IP address of each bare-metal server will consume a lot of time and manpower.

Figure 1:
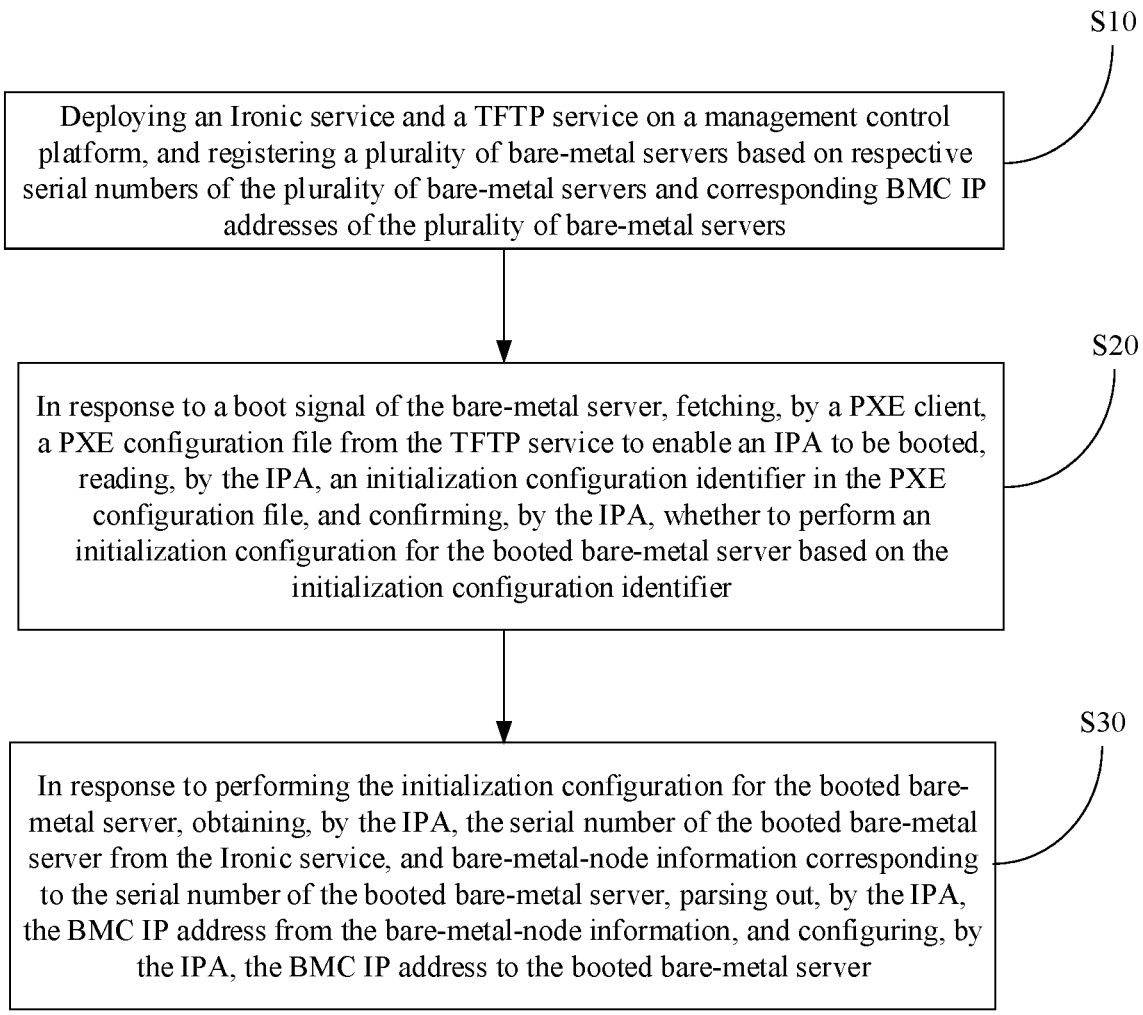
FIG. 1 is a schematic diagram of a method for configuring a BMC IP address of a bare-metal server according to one or more embodiments of the present application.

In some embodiments, the present application provides a method for configuring a BMC IP address of a bare-metal server. FIG. 1 is a schematic diagram showing a process of a method for configuring a BMC IP address of a bare-metal server provided by the present application. As shown in FIG. 1, the method for configuring the BMC IP address of the bare-metal server includes the following steps:

Step S10, deploying an Ironic service and a TFTP (Trivial File Transfer Protocol) service on a management control platform, and registering a plurality of bare-metal servers based on respective serial numbers of the plurality of bare-metal servers and corresponding BMC IP addresses of the plurality of bare-metal servers.

Step S20, in response to a boot signal of the bare-metal server, fetching, by a PXE (Pre-boot Execution Environment) client, a PXE configuration file from the TFTP service to enable an IPA (Ironic Python Agent) to be booted, reading, by the IPA, an initialization configuration identifier in the PXE configuration file, and confirming, by the IPA, whether to perform an initialization configuration for the booted bare-metal server based on the initialization configuration identifier.

Step S30, in response to performing the initialization configuration for the booted bare-metal server, obtaining, by the IPA, the serial number of the booted bare-metal server from the Ironic service, and bare-metal-node (that is, a physical server without deployed with an operating system) information corresponding to the serial number of the booted bare-metal server, parsing out, by the IPA, the BMC IP address from the bare-metal-node information, and configuring, by the IPA, the BMC IP address to the booted bare-metal server. The management control platform in step S10 is a control node of a cloud platform of an OpenStack, wherein the OpenStack is an open-source project for cloud-computing infrastructure. The Ironic service is a bare-metal service in the OpenStack and is responsible for life cycle management for the bare-metal servers. The bare-metal server refers to a physical server that no operating system is installed thereon. The TFTP is a protocol in a TCP/IP (Transmission Control Protocol/Internet Protocol) protocol suite, for transferring trivial or simple files between a client and a server, to provide an uncomplicated and low-overhead file-transfer service. The BMC is a baseboard management controller, which is a remote manager for a server, supporting an IPMI protocol and performing out-of-band management for the server. The IP address refers to an Internet Protocol address, which is a unified address format provided by an IP protocol. The BMC IP address is an IPMI address of the BMC, wherein the IPMI is an industry standard protocol for the out-of-band management for electronic information equipment. The PXE is a protocol designed by Intel, which enables a computer to be booted through a network. The PXE protocol is divided into a PXE client and a PXE server. Usually, the PXE client is in a ROM (Read-Only Memory) of a network card, so the PXE client in the step S20 is in the ROM of the network card of the bare-metal server. The IPA refers to an agent based on a Python (a high-level scripting language that combines interpretability, compileability, interactivity, and object-oriented programming), for handling a series of actions of bare-metal machines in an Ironic project, for example, checking, configuring, cleaning, and deploying images.

The method for configuring the BMC IP address of the bare-metal server provided by the present application, adopts the respective serial numbers of the bare-metal servers as corresponding unique identifiers, to establish a mapping relationship between the respective serial numbers and the corresponding IP addresses of the BMCs of the bare-metal servers, such that a problem that the IP addresses of the BMCs of the respective bare-metal servers need to be manually configured one by one, is solved. By registering the bare-metal servers in batches, the BMC IP addresses of a large number of bare-metal servers may be automatically configured quickly, reducing an error probability of human configuration, and greatly shortening a delivery time of the bare-metal servers, such that a delivery efficiency is improved.

In some embodiments, the step S20 and step S30 include the following steps: in response to the boot signal of the bare-metal server, fetching, by the PXE client, the PXE configuration file from the TFTP service, to enable the IPA to be booted, reading, by the IPA, the initialization configuration identifier in the PXE configuration file, and confirming, by the IPA, to perform the initialization configuration for the booted bare-metal server based on the initialization configuration identifier; and obtaining, by the IPA, the serial number of the booted bare-metal server from the Ironic service, and the bare-metal-node information corresponding to the serial number of the booted bare-metal server, parsing out, by the IPA, the BMC IP address from the bare-metal-node information, and configuring, by the IPA, the BMC IP address to the booted bare-metal server.

In some embodiments, the step of registering the plurality of bare-metal servers includes: registering the plurality of bare-metal servers through an Ironic extension interface.

In some embodiments, the step of registering the plurality of bare-metal servers based on the respective serial numbers of the plurality of bare-metal servers and corresponding BMC IP addresses of the plurality of bare-metal servers, includes: registering the plurality of bare-metal servers, based on respective serial numbers of the plurality of bare-metal servers, the BMC IP addresses corresponding to the respective serial numbers of the plurality of bare-metal servers, and an IPMI netmask and an IPMI gateway address corresponding to the respective serial numbers of the plurality of bare-metal servers. Information for registering may further include other relevant parameters. After the registering, the information for registering may be saved in a database of the management control platform.

In some embodiments, the step of fetching, by the PXE client, the PXE configuration file from the TFTP service to enable the IPA to be booted, includes: fetching, by the PXE client, the PXE configuration file from the TFTP service, to obtain a path of a kernel to be booted and a path of a memory file system to be booted; booting, by the PXE client, the kernel corresponding to the booted bare-metal server through the path of the kernel, and the memory file system corresponding to the booted bare-metal server through the path of the memory file system; and booting the IPA in the memory file system.

In some embodiments, the step of confirming whether to perform the initialization configuration for the booted bare-metal server, includes: confirming whether a value of the initialization configuration identifier is True (correct). In these embodiments, the respective bare-metal server may be powered on manually. Since there is no local disk in the bare-metal server, the bare-metal server will try to obtain a guide of boot through a network. The bare-metal server starts to be booted through the guide of the network, and then the PXE client fetches the PXE configuration file from the TFTP service. In addition, the PXE configuration file is further configured with a url (Uniform Resource Locator) of the Ironic service. After the IPA is booted, the IPA reads the initialization configuration identifier from parameters of the kernel, and the url of the Ironic service. The initialization configuration identifier may be represented by init, and the url of the Ironic service is represented by: ipa_api_url. In response to that the value of the initialization configuration identifier (that is, init) is True, the initialization configuration needs to be performed for the booted bare-metal server.

In some embodiments, the confirming to perform the initialization configuration for the booted bare-metal server, includes the following step: confirming that the value of the initialization configuration identifier is True, and performing the initialization configuration for the booted bare-metal server.

In some embodiments, the method for configuring the BMC IP address of the bare-metal server provided by the application includes the following step: after the IPA is booted, reading the initialization configuration identifier from the parameters of the kernel, and the url, ipa_api_url, of the Ironic service; and confirming the value of the initialization configuration identifier is True, and performing the initialization configuration for the booted bare-metal server.

In some embodiments, the obtaining, by the IPA, the serial number of the booted bare-metal server from the Ironic service, includes: obtaining hardware information of the booted bare-metal server through the Ironic interface, and obtaining the serial number from the hardware information. In these embodiments, the Ironic interface is obtained by invoking a command of dmidecode (functions of dmidecode are to obtain hardware-related information about a machine under a Linux system, and output information thereof includes BIOS, system, motherboard, processor, memory, cache, and so on), the hardware information is obtained through the Ironic interface, and a field "Serial Number" is obtained from the hardware information, that is, the serial number sn of the booted bare-metal server.

In some embodiments, the step of parsing out the BMC IP address from the bare-metal-node information, and configuring the BMC IP address to the booted bare-metal server, includes: parsing out the BMC IP address, the IPMI netmask and the IPMI gateway address from the bare-metal-node information, and configuring the BMC IP address, the IPMI netmask and the IPMI gateway address to the bare-metal server by invoking a command of ipmitool (ipmitool is a management tool for a ipmi platform, which may be used in a command-line manner in a Linux system. Through ipmitool, functions for example obtaining sensor information, displaying system log content, and remote powerup and shutdown via network may be realized. Main functions of ipmitool include obtaining server information; managing users, and creating, deleting, modifying passwords, and so on; network management, for example configuring BMC addresses, and so on; and array card management, and so on). In these embodiments, by invoking another Ironic extension interface, information of a bare-metal node (that is, the bare-metal-node information) corresponding to the serial number is obtained, and three attributes of the node, ipmi_address, ipmi_netmask and ipmi_gateway (that is, address, netmask and gateway of the ipmi), are parsed out; then the command of ipmitool is invoked, to configure a network address of the IPMI of this bare-metal node to be a static address, and set ipaddr (that is, the IP address queried by this bare-metal server in a Linux system) thereof to be ipmi_address, that is, a configuration of the IP address of the BMC of this bare-metal server is completed. In addition, the netmask (that is, a subnet mask to which this bare-metal server belongs, also known as the network mask, is mainly used to extract a network number or a host number from the IP address) thereof is set to be ipmi_netmask, and the defgw (that is, the gateway to which this bare-metal server belongs) thereof is set to be ipmi_gateway, that is, a configuration of the IPMI netmask and the IPMI gateway address is completed.

Figure 2:
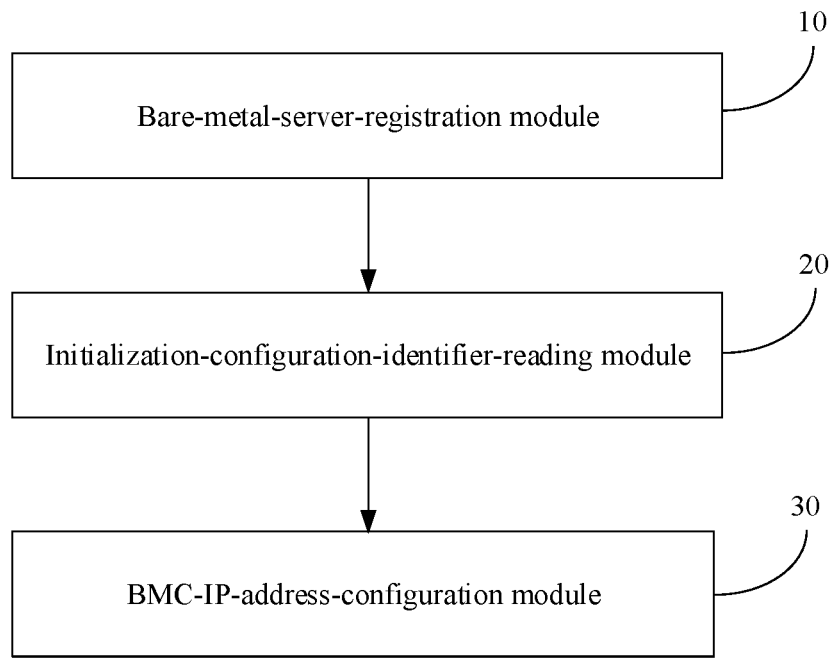
FIG. 2 is a schematic diagram of a system for configuring a BMC IP address of a bare-metal server according to one or more embodiments of the present application.

In some embodiments, the present application further provides a system for configuring a BMC IP address of a bare-metal server. FIG. 2 is a schematic diagram showing the system for configuring the BMC IP address of the bare-metal server provided by the present application. The system for configuring the BMC IP address of the bare-metal server includes: a bare-metal-server-registration module 10, configured to deploy an Ironic service and a TFTP service on a management control platform, and register a plurality of bare-metal servers based on respective serial numbers of the plurality of bare-metal servers and corresponding BMC IP addresses of the plurality of bare-metal servers; an initialization-configuration-identifier-reading module 20, configured to, in response to a boot signal of the bare-metal server, make a PXE client fetch a PXE configuration file from the TFTP service to enable an IPA to be booted, make the IPA read an initialization configuration identifier in the PXE configuration file, and make the IPA confirm whether to perform an initialization configuration for the booted bare-metal server based on the initialization configuration identifier; and a BMC-IP-address-configuration module configured to, in response to performing the initialization configuration for the booted bare-metal server, make the IPA obtain the serial number of the booted bare-metal server from the Ironic service, and bare-metal-node information corresponding to the serial number of the booted bare-metal server, make the IPA parse out the BMC IP address from the bare-metal-node information, and make the IPA configure the BMC IP address to the booted bare-metal server.

The system for configuring the BMC IP address of the bare-metal server provided by the application solves the problem that the IP addresses of the BMCs of the respective bare-metal servers need to be manually configured one by one. By registering the bare-metal servers in batches, the BMC IP addresses of a large number of bare-metal servers may be automatically configured quickly, reducing the error probability of human configuration, and greatly shortening the delivery time of the bare-metal servers, such that the delivery efficiency is improved.

In some embodiments, the present application further provides one or more nonvolatile computer-readable storage media storing computer-readable instructions, wherein, in response to that the computer-readable instructions are executed by one or more processors, the computer-readable instructions cause the one or more processors to perform the steps of the method for configuring the BMC IP address of the bare-metal server in any one of the foregoing embodiments.

It should be understood that, in a condition that there is no confliction with each other, the respective embodiments, features and advantages set forth above for the method for configuring the BMC IP address of the bare-metal server according to the present application, are equally applicable to the system for configuring the BMC IP address of the bare-metal server according to the present application, and the nonvolatile computer-readable storage medium thereof. That is to say, the above respectively embodiments applied to the method for configuring the BMC IP address of the bare-metal server and the variations thereof, may be directly transferred to the system and the nonvolatile computer-readable storage medium according to the present application, and directly combined with them, which will not be repeated here, for the sake of brevity of the present disclosure.

Figure 3:
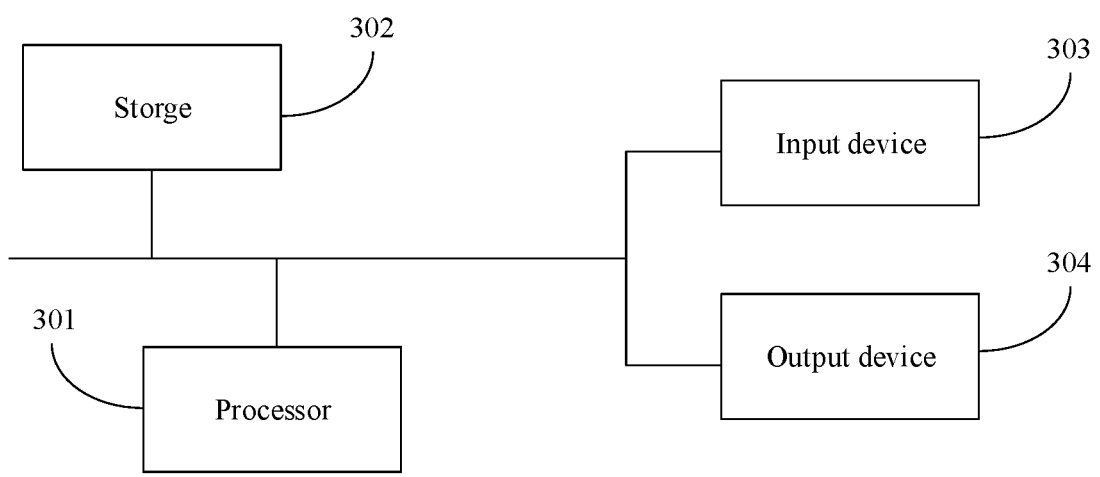
FIG. 3 is a schematic diagram of a hardware structure of a computer device for performing the method for configuring a BMC IP address of a bare-metal server according to one or more embodiments of the present application.

In some embodiments, the present application further provides a computer device, including a storage 302 and one or more processor 301 shown in FIG. 3, wherein the storage 302 stores computer-readable instructions, and in response to that the computer-readable instructions are executed by the one or more processor 301, the computer-readable instructions cause the processor 301 to perform the steps of the method for configuring the BMC IP address of the bare-metal server in any one of the foregoing embodiments.

FIG. 3 is a schematic diagram of a hardware structure of the computer device for performing the method for configuring the BMC IP address of the bare-metal server provided by the present application. Taking the computer device shown in FIG. 3 as an example, the computer device includes the one or more processor 301 and the storage 302, and may further include an input device 303 and an output device 304. The one or more processor 301, the storage 302, the input device 303 and the output device 304 may be connected by a bus or in other ways, and a connection by the bus is taken as an example in FIG. 3. The input device 303 may receive inputted numerical or character information, and generate key signal input related to user settings and function control of the system for configuring the BMC IP address of the bare-metal server. The output device 304 may include a display device for example a display screen. By executing the nonvolatile computer-readable instructions stored in the storage 302, the one or more processor 301 executes various functional applications and data processing of the computer device, so as to realize the relevant steps of the foregoing method for configuring the BMC IP address of the bare-metal server.

Finally, it should be noted that any reference to memory, storage, database or other media used in the respective embodiments provided in the application may be a volatile memory or a nonvolatile memory, or may include the volatile memory and a nonvolatile memory. By way of example and not limitation, the nonvolatile memory may include read only memory (ROM), programmable ROM (PROM), electrically programmable ROM (EPROM), electrically erasable programmable ROM (EEPROM), or flash memory. The volatile memory may include random access memory (RAM), which may act as external cache memory. By way of example and not limitation, the RAM may be available in various forms for example Synchronous RAM (DRAM), dynamic RAM (DRAM), synchronous DRAM (SDRAM), double data rate SDRAM (DDR SDRAM), enhanced SDRAM (ESDRAM), synchronous link DRAM (SLDRAM), and direct Rambus RAM (DRRAM). The storage devices of the disclosed aspects are intended to include, but not be limited to, these and other suitable types of memory.

Those skilled in the art will further appreciate that various exemplary logical blocks, modules, circuits, and algorithm steps described in combination with the disclosure herein may be implemented as electronic hardware, computer software, or their combination. To clearly illustrate this interchangeability of hardware and software, various illustrative components, blocks, modules, circuits, and steps have been described generally in terms of their functions. Whether such functions are implemented as software or hardware depends on the concrete application and design constraints imposed on an overall system. Those skilled in the art may implement the functions in various manners for respective concrete applications, but such implementation decisions should not be interpreted as causing a departure from a scope disclosed by the embodiments of the present application.

The above are exemplary embodiments disclosed in the present application, but it should be noted that various changes and modifications may be made without departing from the scope of the disclosure of the embodiments of the present application defined by the claims. The functions, steps and/or actions of method claims in accordance with the disclosed embodiments described herein need not be performed in any particular order. Furthermore, although elements disclosed in the embodiments of the present application may be described or claimed in an individual form, unless explicitly limited to be single, they may further be construed as plural.

It should be understood that, as used herein, a singular form "a" is intended to include a plural form as well, unless the context clearly supports an exception. It will further be understood that "and/or" as used herein is meant to include any and every possible combination of one or more of relatedly-listed items. The above-mentioned embodiments of the present application disclose serial numbers of the embodiments merely for description, and do not represent advantages and disadvantages of the embodiments.

Those of ordinary skill in the art should understand that discussion of any of the above embodiments is merely exemplary, and is not intended to imply that the scope disclosed by the embodiments of the present application (including the claims) is limited to these examples; under an idea of the embodiments of the present application, the technical features in the above embodiments or different embodiments may be combined as well, and there are many other changes in different aspects as the above embodiments of the present application, which are not provided in detail for sake of brevity. Therefore, any omission, modification, equivalent replacement, improvement, and so on, made within a spirit and principle of the embodiments of the present application should be included within the protection scope of the embodiments of the present application.

The invention claimed is:

1. A method for configuring a BMC (Baseboard Management Controller) IP (Internet Protocol) address of a bare-metal server, comprising following steps:
deploying an Ironic service and a TFTP (Trivial File Transfer Protocol) service on a management control platform, and registering a plurality of bare-metal servers based on respective serial numbers of the plurality of bare-metal servers and corresponding BMC IP addresses of the plurality of bare-metal servers;
in response to a boot signal of the bare-metal server, fetching, by a PXE (Pre-boot Execution Environment) client, a PXE configuration file from the TFTP service to enable an IPA (Ironic Python Agent) to be booted, reading, by the IPA, an initialization configuration identifier in the PXE configuration file, and confirming, by the IPA, whether to perform an initialization configuration for the booted bare-metal server based on the initialization configuration identifier, wherein the fetching comprises: fetching, by the PXE client, the PXE configuration file from the TFTP service, to obtain a path of a kernel corresponding to the bare-metal server to be booted and a path of a memory file system to be booted; booting, by the PXE client, the kernel corresponding to the booted bare-metal server through the path of the kernel, and the memory file system corresponding to the booted bare-metal server through the path of the memory file system; and
booting the IPA in the memory file system; and
in response to performing the initialization configuration for the booted bare-metal server, obtaining, by the IPA, the serial number of the booted bare-metal server from the Ironic service, and bare-metal-node information corresponding to the serial number of the booted bare-metal server, parsing out, by the IPA, the BMC IP address from the bare-metal-node information, and configuring, by the IPA, the BMC IP address to the booted bare-metal server.

2. The method according to claim 1, wherein the registering the plurality of bare-metal servers based on the respective serial numbers of the plurality of bare-metal servers and the corresponding BMC IP addresses of the plurality of bare-metal servers, comprises: registering the plurality of bare-metal servers, based on the respective serial numbers of the plurality of bare-metal servers, the BMC IP addresses corresponding to the respective serial numbers of the plurality of bare-metal servers, and an IPMI (Intelligent Platform Management Interface) netmask and an IPMI gateway address corresponding to the respective serial numbers of the plurality of bare-metal servers.

3. The method according to claim 2, wherein the parsing out, by the IPA, the BMC IP address from the bare-metal-node information, and configuring, by the IPA, the BMC IP address to the booted bare-metal server, comprises: parsing out the BMC IP address, the IPMI netmask and the IPMI gateway address from the bare-metal-node information, and configuring the BMC IP address, the IPMI netmask and the IPMI gateway address tothe booted bare-metal server by invoking a command of ipmitool.

4. The method according to claim 1, wherein the obtaining, by the IPA, the serial number of the booted bare-metal server from the Ironic service, comprises: 5obtaining hardware information of the booted bare-metal server through an Ironic interface, and obtaining the serial number of the booted bare-metal server from the hardware information.

5. The method according to claim 4, wherein, the Ironic interface is obtained by invoking a command of dmidecode.

6. The method according to claim 4, wherein, a field "Serial Number" is obtained from the hardware information, so as to obtain the serial number of the booted bare-metal server.

7. The method according to claim 4, wherein, by invoking another Ironic extension interface, to obtain the bare-metal-node information corresponding to the serial number.

8. The method according to claim 1, wherein the confirming, by the IPA, whether to perform the initialization configuration for the booted bare-metal server based on the initialization configuration identifier, comprises: confirming whether a value of the initialization configuration identifier is True.

9. The method according to claim 8, wherein, in response to that the value of the initialization configuration identifier is True, the initialization configuration is performed for the booted bare-metal server.

10. The method according to claim 1, wherein the management control platform is a control node of a cloud platform of an OpenStack, wherein the OpenStack is an open-source project for cloud-computing infrastructure.

11. The method according to claim 10, wherein the Ironic service is a bare-metal service in the OpenStack and is responsible for life cycle management for the bare-metal servers.

12. The method according to claim 1, wherein the PXE configuration file is further configured with a uniform resource locator of the Ironic service.

13. The method according to claim 12, wherein, after the IPA is booted, the IPA reads the initialization configuration identifier from parameters of a kernel corresponding to the bare-metal server, and the uniform resource locator of the Ironic service; and in response to that a value of the initialization configuration identifier is True, the initialization configuration is performed for the booted bare-metal server.

14. The method according to claim 1, wherein the registering the plurality of bare-metal servers based on the respective serial numbers of the plurality of bare-metal servers and the corresponding BMC IP addresses of the plurality of bare-metal servers, comprises: registering the plurality of bare-metal servers through an Ironic extension interface.

15. A computer device, comprising: a storage and one or more processors, wherein the storage stores computer-readable instructions, and in response to that the computer-readable instructions are executed by the one or more processors, the computer-readable instructions cause the one or more processors to perform the steps of the method according to claim 1.

16. One or more non-transitory computer-readable storage medium storing computer-readable instructions, wherein, in response to that the computer-readable instructions are executed by one or more processors, the computer-readable instructions cause the one or more processors to perform the steps of the method according to claim 1.

17. The method according to claim 1, wherein the PXE client is in Read-Only Memory of a network card of the bare-metal server.

18. The method according to claim 1, wherein, after the registering, information for registering is saved in a database of the management control platform.

19. The method according to claim 1, wherein the bare-metal server starts to be booted through a guide of network, and then the PXE client fetches the PXE configuration file from the TFTP service.

\* \* \* \* \*